United States Patent [19]

Schereer et al.

[11] Patent Number: 4,858,578
[45] Date of Patent: Aug. 22, 1989

[54] FUEL INJECTION NOZZLE ARRANGEMENT

[75] Inventors: Friedrich Schereer, Unterensingen; Kurt Schmied, Denkendorf; Henning Osterwald, Fellbach, all of Fed. Rep. of Germany

[73] Assignee: Daimler-Benz Aktiengesellschaft, Stuttgart, Fed. Rep. of Germany

[21] Appl. No.: 631,067

[22] Filed: Jul. 16, 1984

[30] Foreign Application Priority Data

Jul. 15, 1983 [DE] Fed. Rep. of Germany ....... 3325586

[51] Int. Cl.$^4$ ............................................... F02F 3/26
[52] U.S. Cl. .................................................... 123/276
[58] Field of Search ............... 123/276, 274, 279, 275, 123/285, 294, 657, 661, 664

[56] References Cited

U.S. PATENT DOCUMENTS

| | | | |
|---|---|---|---|
| 1,633,541 | 6/1927 | Braren | 123/276 |
| 2,171,912 | 9/1939 | Boxan | 123/276 |
| 2,205,493 | 6/1940 | Sauror | 123/276 |
| 2,959,161 | 11/1960 | Böllger | 123/276 |

FOREIGN PATENT DOCUMENTS

| | | | |
|---|---|---|---|
| 44179 | 1/1931 | Denmark | 123/276 |
| 877230 | 5/1953 | Fed. Rep. of Germany | 123/276 |
| 473733 | 8/1952 | Italy | 123/276 |
| 49521 | 4/1981 | Japan | 123/276 |

OTHER PUBLICATIONS

Bosch Automotive Handbook, 18th German/1st English edition, ©1976, pp. 256-265.

Primary Examiner—Raymond A. Nelli
Attorney, Agent, or Firm—Barnes & Thornburg

[57] ABSTRACT

A combustion chamber arrangement and a method for the same, having a piston with a combustion trough adjacent an end thereof and a fuel injection nozzle for injecting fuel through nozzle holes against boundary walls of the combustion trough. The number of nozzle holes is based on the specific characteristics of the combustion trough depth, diameter and a dimensionless constant representation of the spin number of the combustion air entering the combustion trough.

3 Claims, 1 Drawing Sheet

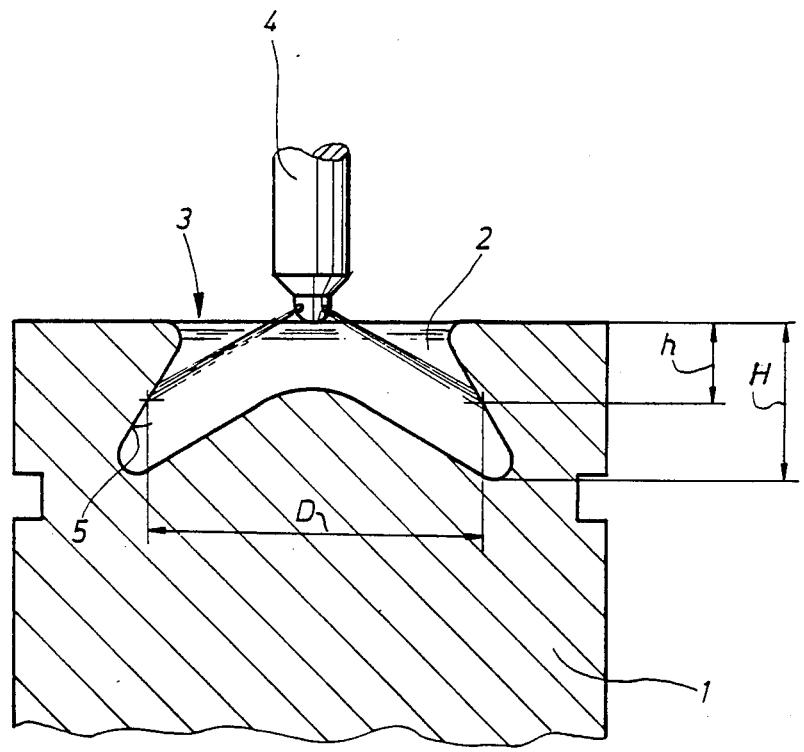

FUEL INJECTION NOZZLE ARRANGEMENT

BACKGROUND AND SUMMARY OF THE INVENTION

The invention relates to a fuel injection nozzle for an air-compression internal-combustion engine of the type having a plurality of nozzle holes through which fuel is injected against the boundary wall of a combustion trough arranged in a piston. The volume of the combustion trough is predetermined based upon the compression ratio and the piston stroke volume.

Experimental results relating to the combustion cycle and emission behavior of a direct-injection internal-combustion engine are known from an article in SAE Paper 80 09 86 by Masahiko Hori and Hiromi Sugiyama, titled "Combined Measurement by Photography and Gas Sampling for Combustion Analysis in a Diesel Engine Cylinder." For this purpose, the distribution of the fuel/air mixture and the flame propagation as a function of the compression and of the dimensions of the combustion chamber is detected by photographic methods and the emission is analyzed as to its composition, whereby discoveries are made as to how far air movements in the combustion chamber influence the combustion process.

An internal-combustion engine with a reciprocating piston is known from German Offenlegungsschrift (Published Unexamined Patent Application) No. 26 52 662, with which piston an inlet nozzle is associated which sprays fuel up to an angle of 20° onto the wall of the combustion trough accommodated by the piston. Although the combustion trough accommodated by the piston is determined in its dimensions, nevertheless no instructions as to a determination of the number of the nozzle holes can be obtained from this disclosure.

An object of the invention is to optimize the number of the nozzle holes in the context of combustion trough parameters in the case of a fuel injection nozzle associated with the combustion trough.

This object is achieved according to the invention by providing an arrangement wherein the number of nozzle holes required for optimum combustion is determined and arranged in the nozzle according to the relationship $$Z = \left[ \frac{D \times \pi}{H \times K} \right]$$

with $Z$ = number of nozzle holes of the fuel injection nozzle, $D$ = diameter of the combustion trough in the region of the fuel contact with the boundary wall of the combustion trough in mm, $H$ = depth of the combustion trough in mm, $K$ = dimensionless constant which describes the qualitative value of the spin number of the combustion air on entering the combustion trough, and assumes the value 1.0 for combustion air entering the combustion trough without spin and assumes the value equal to or less than 1.5 for combustion air entering the combustion trough with spin $[\ldots]$ = signifies a smaller integer determined from the relation or the integral portion of the number.

In certain preferred embodiments of the invention where the combustion trough depth is 24 mm (millimeters), the number of the nozzle holes is determinable according to the relation $$Z = \left[ c \times \frac{D}{K} \right]$$

with $D$ = diameter of the combustion trough in the region of the fuel contact with the boundary wall of the combustion trough in mm, $K$ = dimensionless constant which assumes the value 1.0 for combustion air entering the combustion trough without a spin and a value equal to or less than 1.5 for combustion air entering the combustion trough with spin, $[\ldots]$ = signifies a smaller integer determined from the relation of the integral portion of the number, and $c$ = is a constant which is determinable by the relation $\pi/H = 0.13$ $mm^{-1}$ where $H = 24$ mm.

In certain preferred embodiments of the invention, the diameter $D$ of the combustion trough is determinable by the relation $$D = \sqrt{\frac{4 \times V_h \times K_1}{\pi \times H(\epsilon - 1)K_2}}$$

with $V_h$ ... as stroke volume of a cylinder in $mm^3$ $K_1$ ... as dimensionless trough fractions of compression volume $H$ ... depth of the combustion trough in mm $\epsilon$ ... compression ratio, and $K_2$ ... a volume ratio for an insert accommodated by the combustion trough.

By utilizing the arrangement according to the invention, it is possible for the first time to optimally determine and arrange the number of the nozzle holes of a fuel injection nozzle as a function of the combustion trough diameter, whereby the requirements of a uniform fuel distribution in the combustion chamber of the internal-combustion engine and a constant atomization into the smallest possible droplets are fulfilled. Due to the more uniform fuel distribution and atomization in the combustion chamber into the greatest possible number of small droplets a virtually homogeneous mixture is produced, which leads to a more uniform temperature distribution during combustion in the combustion chamber. Since the evolution of nitric oxide increases superproportionately with the temperature, a homogeneous temperature distribution leads to a lower nitric oxide emission.

Further objects, features, and advantages of the present invention will become more apparent from the following description when taken with the accompanying drawing which show, for purposes of illustration only, an embodiment in accordance with the present invention.

BRIEF DESCRIPTION OF THE DRAWING

The single drawing FIGURE schematically depicts a cross-section of the end portion of a piston containing a combustion trough and with fuel injection diesel engine nozzle constructed in accordance with a preferred embodiment of the present invention.

DETAILED DESCRIPTION OF THE DRAWING

A piston 1, provided with a combustion trough 2, of an internal-combustion engine not shown in detail is illustrated in longitudinal section. The omega shaped combustion trough 2 exhibits a mean diameter "D", in the region of which the fuel is sprayed against the boundary wall 5 of the combustion trough 2. The combustion trough 2 is constricted at an upper aperture 3 opening to the cylinder chamber, not shown. The fuel is injected through a fuel injection nozzle 4 arranged centrally to the combustion trough 2, into the combustion trough 2. The combustion trough depth "H" assumes a value from 22 mm to 24 mm. Starting from the upper aperture 3 in the direction of the combustion trough floor, the mean combustion trough diameter is determinable after an interval "h" which assumes a value from 10 mm to 12 mm. The determination of the combustion trough dimensions is made by means of geometrical relations of the internal-combustion engine parameters such as the stroke volume, the compression ratio and the stroke/bore ratio. The required combustion trough volume is determinable by the mathematical equations (1) - (4) below:

$$V_{VM} = \frac{V_h \times K_1}{\epsilon - 1} \quad \text{Equation 1}$$

where $V_h$ = stroke volume of a cylinder in mm$^3$ $V_C$ = compression volume in the top dead center position of the piston in mm$^3$, $V_{VM}$ = combustion trough volume in mm$^3$, $V_S$ = "detrimental" volume such as pinch gap in mm$^3$, and $K_1$ = dimensionlesss trough fraction of compression volume.

The compression volume is represented by the relation $V_C = V_{VM} + V_S$ Equation 2 and the trough fraction of the compression volume $K_1$ is represented by the relation $$K_1 = \frac{V_{VM}}{V_C} \quad \text{Equation 3}$$

The compression ratio $\epsilon$ is determinable by the relation $$\epsilon = \frac{V_h}{V_C} + 1 \quad \text{Equation 4}$$

For a combustion trough depth of 22 mm to 24 mm, the diameter of the combustion trough is determinable by an association of the above-mentioned mathematical equations. For a combustion trough, in the trough center of which a cone-like elevation is provided to increase the combustion trough diameter, the volume of the combustion trough is determinable by the mathematical equations (5) to (8) below, where:

$$V_{VM} = K_2 \times D^2 \times \frac{\pi}{4} \times H \quad \text{Equation 5}$$

A volume ratio $$K_2 = \frac{V_{VM}}{V_{VM} + V_K} \quad \text{Equation 6}$$

with $V_K$ as the cone volume is introduced additionally as a constant. The combustion trough diameter D is determinable from the equation $$D = \sqrt{\frac{4 \times V_h \times K}{\pi \times H(\epsilon - 1) K_2}} \quad \text{Equation 7}$$

the value 0.85 for $K_1$ and the value 0.80 for $K_2$ being inserted empirically. With the diameter ascertained for the combustion trough, the number of the nozzle holes of the fuel injection nozzle is determined by the equation $$Z = \left[ \frac{D \times \pi}{H \times K} \right] \quad \text{Equation 8}$$

"D" designates the combustion trough diameter and "K" a dimensionless correction factor, which assumes the value 1.0 for combustion air entering the combustion trough without spin.

It is known from a lecture by Prof. F. Pischinger at the Fista Congress in London 1962 on development work on a combustion system for vehicle diesel engines, how the spin number, that is to say the speed of rotation of the cylinder charge, is determinable in proportion to the rotary speed of the internal-combustion engine. For a spin number of 3.2, which is currently customary according to Pischinger, K assumes a value of 1.5. K values for spin numbers which are smaller than 3.2 are determinably by the relation $$K = 1 + \frac{\text{spin number}}{6.4} \quad \text{Equation 9}$$

The bracket [. . . . ] of Equation 8 signifies in this special case the next smaller integer or the integral portion of the result is adopted as the result of the [. . . ]. For example, if the calculated value according to Equation 8 is 7.95, seven nozzles would be selected.

In a further exemplary embodiment with a combustion trough depth "H" of 24 mm, the number of the nozzle holes is determined by the relation $$Z = \left[ c \times \frac{D}{K} \right]$$

where c . . . is a constant which is determinable by the term $\pi/H$ and exhibits the value 0.13 mm$^{-1}$.

The K-value is a dimensionless constant which assumes the value 1.0 for the combustion air entering the combustion trough without spin.

$$\text{For a spin number} = \frac{\text{rotary speed of cylinder charge}}{\text{rotary speed of internal-combustion engine (crankshaft)}}$$

which equals 3.2, K assumes the value 1.5. For spin numbers which are smaller than 3.2, the associated K- value is determinable by a arithmetical expression according to Equation (9).

A supercharged internal-combustion engine with a cylinder power of 60 hp, a stroke volume of 2 liters per cylinder and an omega-shaped combustion trough in the piston comprises a fuel injection system which exhibits a system pressure of approximately 1000 bar at the nominal power of the internal combustion engine. The fuel injection nozzle comprises eight nozzle holes with a nozzle hole length of 0.8 mm, through which the fuel is injected into the combustion chamber, in this case the total nozzle hole cross-sectional area is 0.43 mm². The number of the nozzle holes in this internal-combustion engine was determined by the procedure according to the invention. The nitric oxide emission was substantially lower than for comparable internal-combustion engines, the fuel injection nozzles of which exhibit only four nozzle holes.

The relation for determining the number of the nozzle holes of a fuel injection nozzle according to the invention is not restricted soley to the exemplary embodiment illustrated. On the contrary, the procedure according to the invention may also be applied in the case of a combustion trough arranged eccentrically in the piston with a fuel injection nozzle arranged eccentrically to accommodate the combustion trough position, especially with the combustion trough bounded by a cylindrical wall.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A method of manufacturing a fuel injection nozzle used in a combustion chamber arrangement of an air-compression internal combustion engine having a piston and a combustion trough adjacent an end of said piston, wherein fuel is injected against a boundary wall of said combustion trough through said nozzle holes, wherein the method comprises the steps of:
   (a) determining the diameter D of said combustion trough in the region of fuel contact with said boundary wall of said combustion trough,
   (b) determining the depth H of said combustion trough,
   (c) determining the value of a dimensionless constant K which is equivalent to a qualitative value of the spin number of the spin of the combustion air entering said combustion trough, said value being equal to or less than 1.5 for combustion air entering said trough with said spin and equal to 1.0 for combustion air entering said trough without spin,
   (d) multiplying the value of D with the value of $\pi$ and dividing the above by the product of the value for H and K, whereby the resulting value represents the optimum number of holes for said fuel injection nozzle,
   (e) making a fuel nozzle with said determined optimum number of holes.

2. The method of claim 1, wherein the determining of the diameter D of said combustion trough further comprises the steps of:
   (a) determining a stroke volume $V_h$ of a cylinder,
   (b) determining a compression ratio of said cylinder,
   (c) determining a dimensionless trough fraction $K_1$ from the combustion trough volume $V_{vm}$ divided by the compression volume $V_c$ in the top dead center position of the piston,
   (d) determining a volume ratio $K_2$ for an insert accommodated by the combustion trough,
   (e) determining the diameter D from the following relationship $$D = \sqrt{\frac{4 \times V_h \times K_1}{\pi \times H(\epsilon - 1)K_2}}$$

3. The method of claim 1, wherein the determining of the dimensionless constant K further comprises the steps of:
   (a) determining the spin number by dividing the speed of rotation of the cylinder charge with the speed of rotation of the internal combustion engine,
   (b) determining the constant K by dividing said spin number by 6.4 and adding one to the dividend.

* * * * *